United States Patent Office 3,324,178
Patented June 6, 1967

3,324,178
BIOLOGICALLY ACTIVE N-HEXAHALO-
HYDROXYISOPROPYL AMIDES
Peter E. Newallis, Morris Plains, and Edmund J. Ruma-
nowski, Jersey City, N.J., assignors to Allied Chemical
Corporation, New York, N.Y., a corporation of New
York
No Drawing. Filed Jan. 6, 1964, Ser. No. 336,054
6 Claims. (Cl. 260—561)

This invention relates to biologically active compounds and, more particularly, refers to N-hexahalohydroxyisopropyl amides, processes for their preparation and to their use for the regulation and destruction of insects.

It is an object of the present invention to provide new pesticidal compositions.

Another object of the present invention is to provide new N-hexahalohydroxyisopropyl amides.

It is a further object of the present invention to provide processes for the preparation of N-hexahalohydroxyisopropyl amides. Other objects and advantages will be apparent from the following description.

In accordance with the present invention, N-hexahalohydroxyisopropyl amides having the general formula:

$$\begin{array}{c} X \\ | \\ X_3-C-X_1\ H\ O \\ | \quad\quad | \ \| \\ HO-C\text{------}N-C-R \\ | \\ X_4-C-X_6 \\ | \\ X_5 \end{array}$$

wherein $X_1$, $X_2$, $X_3$, $X_4$, $X_5$ and $X_6$ are halogens independently selected from the group consisting of chlorine and fluorine with the proviso that at least 2 of these members are fluorine, and R is a member selected from the group consisting of hydrogen, alkyl having 1 to 12 carbon atoms, haloalkyl and polyhaloalkyl having 1 to 12 carbon atoms, substituted and nonsubstituted aryl, may be prepared by reacting an amide of the formula:

$$\begin{array}{c} H\ O \\ | \ \| \\ N-C-R \\ | \\ H \end{array}$$

wherein R is as defined above, with a hexahaloacetone of the formula:

$$\begin{array}{c} X_1\ O\ X_4 \\ | \ \| \ | \\ X_2-C-C-C-X_5 \\ | \quad\ \ | \\ X_3\quad X_6 \end{array}$$

wherein $X_1$, $X_2$, $X_3$, $X_4$, $X_5$ and $X_6$ are as defined above, in the presence of a solvent and recovering the resulting N-hexahalohydroxyisopropyl amide from the reaction mixture. In the above definition the term substituted and nonsubstituted aryl is defined as aromatic radicals such as phenyl, benzyl, biphenyl and naphthyl which may contain alkyl or halogen substituents.

Illustrative of suitable amide reactants are the following:

formamide
acetamide
propanamide
n-butyramide
i-butyramide
pentanamide
hexanamide
chloroformamide
bromoacetamide
chloroacetamide
2-chloropropanamide
n-octanamide
lauramide
benzamide
o-toluamide
p-toluamide
p-ethylbenzamide
p-nitrobenzamide
2,4-dimethylbenzamide
2,4-dichlorobenzamide
1-naphthamide
1-diphenimide, and the like.

The hexahaloacetones which may be utilized in the present invention and their respective boiling points are set forth below in Table I.

TABLE I

| Hexahaloacetone: | Boiling point, °C. |
|---|---|
| 1,1-difluorotetrachloroacetone | 123 |
| sym-difluorotetrachloroacetone | 124 |
| 1,1,3-trifluorotrichloroacetone | 84.5 |
| 1,1,1-trifluorotrichloroacetone | 83 |
| sym-tetrafluorodichloroacetone | 45 |
| 1,1,1,3-tetrafluorodichloroacetone | 43 |
| pentafluorochloroacetone | 8 |
| hexafluoroacetone | −28 |

The molar ratio of the reactants may fall within the range of from about 0.5 to 2 mols amide per mol hexahaloacetone, however, in preferred operation, the stoichiometric molar ratio of 1 mol amide per mol hexahaloacetone is employed.

The reaction temperature may vary over a wide range, i.e. from about −20° C. up to the boiling point of the reaction mixture. In preferred operation, however, reaction temperatures from about room temperature up to about 60° C. are employed. The reaction is of an exothermic nature, and the time of reaction may vary over a wide range and reaction times of from about 5 minutes to about 10 hours have been employed. Highest yields are secured, however, with a reaction time of from about 1 to 5 hours.

In many instances, the reactants do not have a common physical state. For example, most amides are solids whereas the hexahaloacetones, with the exception of hexafluoroacetone and pentafluorochloroacetone, are liquids at room temperature. Accordingly, it is most desirable to employ a suitable solvent in order to facilitate the obtainment of a homogenous reaction mixture and also to secure ease of reaction. Any solvent may be utilized provided it is a solvent for the amide reactant, and is inert under the conditions of reaction. Generally speaking, chlorinated aliphatic hydrocarbons such as carbontetrachloride, completely substituted alkyl ethers of alkylene glycols such as the dimethylether of methylene glycol and the dimethylether of propylene glycol are satisfactory, preferred solvents being 1,4-dioxane, tetrahydrofuran, and the like.

In preferred operation, a reaction mixture comprised of 1 mol amide is admixed with a suitable solvent such as tetrahydrofuran and isopropyl ether. Then 1 mol of hexahaloacetone is slowly added to the mixture, controlling the exothermicity so as to maintain the reaction temperature with a range of from about room temperature to about 60° C. The reaction mixture is then agitated for an additional period of about 2 hours and allowed to cool to room temperature. The solvent is then removed by vacuum distillation and the resulting N-hexahalohydroxyisopropyl amide is admixed with a solvent, filtered to remove impurities and the pure N-hexahalohydroxyisopropyl amide is isolated by distilling off the solvent. The following examples illustrate the present invention. In the examples, parts are by weight.

Example 1

To a reaction vessel equipped with a stirrer, thermometer and inlet tube was charged a mixture comprised of 125 parts of tetrahydrofuran and 11.8 parts of acetamide. To this mixture were gradually added 40 parts of hexafluoroacetone and the reaction temperature increased from room temperature to 50° C. over a period of 20 minutes. The resulting mixture was stirred for an additional period of 30 minutes and then cooled to room temperature. Tetrahydrofuran and excess hexafluoroacetone were removed under reduced pressure and the remaining crude N-hexafluoro-2-hydroxy-2-propyl acetamide was quenched in about 40 parts of hexane, filtered and dried. A yield of 37 parts of N-hexafluoro-2-hydroxy-2-propyl acetamide, corresponding to 82% of theory and having a melting point of 85°–87° C., was obtained.

Example 2

To the reaction vessel of Example 1 was charged a reaction mixture comprised of 90 parts tetrahydrofuran and 5.9 parts acetamide. 22 parts of sym-tetrafluorodichloroacetone were slowly added under constant agitation for a period of 30 minutes at a temperature maintained within the range of 30° to 40° C. Excess tetrahydrofuran was then removed by vacuum distillation and the resulting solid was drowned in hexane, filtered and dried. 11.5 parts of N - sym - tetrafluorodichloro-2-hydroxy-2-propyl acetamide having a melting point of 83 to 84° C., were obtained. Elemental analysis showed 22.9% carbon and 2.23% hydrogen which is in excellent agreement with the theoretical values of 23.3% carbon and 1.94% hydrogen.

Example 3

To the reaction vessel of Example 1 was charged a mixture comprised of 45 parts formamide and 45 parts of tetrahydrofuran. To this mixture were slowly added 22 parts of sym-tetrafluorodichloroacetone and the resulting reaction mixture was agitated for a period of 15 minutes at a temperature of about 45° C. The mixture was heated to reflux temperature for a period of 15 minutes and the tetrahydrofuran was removed by air blowing. The resulting crude N-sym-tetrafluorodichloro-2-hydroxy-2-propyl formamide was quenched 3 times in petroleum ether at a temperature of from about 30° to 65° C. followed by filtration and drying. 16 parts of pure N-sym-tetrafluorodichloro-2-hydroxy-2-propyl formamide having a melting point of 103–103.5° C., were obtained.

Example 4

To the reaction vessel of Example 1 was charged a reaction mixture comprised of 90 parts of tetrahydrofuran and 6 parts acetamide. 16.6 parts of hexafluoroacetone were slowly introduced and the resulting reaction mixture was maintained at a temperature of 25° to 40° C. for a period of 15 minutes. Stirring was continued within this temperature range for an additional period of 30 minutes whereupon the resulting reaction mixture was reduced to ⅕ of its volume by evaporation. 120 parts of hexane were added and the resulting mixture was cooled by immersion into a Dry Ice bath. The mixture was filtered and dried whereupon 9 parts of N-hexafluoro-2-hydroxy-2-propyl acetamide having a melting point of 90–92° C., were recovered. Elemental analysis showed 26.8% carbon, 2.49% hydrogen and 47.1% fluorine which is in excellent agreement with the theoretical values of 26.7% carbon, 2.22% hydrogen and 50.7% fluorine.

Example 5

To the reaction vessel of Example 1 was charged a reaction mixture comprised of 7.8 parts of p-chlorobenzamide, 11 parts of sym-tetrafluorodichloroacetone and 45 parts of acetonitrile. The resulting reaction mixture was then agitated and allowed to stand for a period of 96 hours. At the end of this period, the acetonitrile was removed under reduced pressure and 14 parts of crude N-sym-tetrafluorodichloro-2-hydroxy-2-propyl p-chlorobenzamide were obtained. The crude product was then recrystallized from toluene to yield 7 parts of pure N-sym-tetrafluorodichloro-2-hydroxy-2-propyl p-chlorobenzamide having a melting point of 95° to 100° C.

N-hexafluoro-2-hydroxy-2-propyl chloroacetamide as prepared in accordance with Example 2 was then tested as a fumigant in accordance with the following procedure.

The test insects employed were the larvae of a yellow Mealworm (*Tenebrio molitor*), the adult Confused flour Beetle (*Tribolium confusam*) and the larvae of the Lesser Mealworm (*Alphotobius diaperimus*). 10 insects of each species were placed in 1.5 inch diameter salve tins with perforated lids. A small amount of insect food comprised of grain, flour, ground dog food, etc. was then placed in each tin. The dosage employed was about 1 gram of N-hexa-fluoro-2-hydroxy-2-propyl chloroacetamide absorbed in a cellucotton wad. As soon as the N-hexafluoro-2-hydroxy-2-propyl acetamide was introduced, the jars were sealed. At the end of 24 hours, the insect containers were removed and mortality rate was determined.

100% kill was realized in the case of the larvae of the Yellow Mealworm and the Lesser Mealworm whereas a 20% kill was realized in the case of the Confused flour beetles. In this latter case, however, it was determined that the remaining 80% died within the following 24 hours.

N - sym - tetrafluorodichloro-2-hydroxy-2-propyl formamide, as prepared in accordance with the procedure outlined in Example 3, was found to be biologically effective in the regulation and destruction of the common housefly, (*Musca domestica*), as shown by the data obtained by the test procedure outlined below.

Briefly, the tests comprised the preparation of a suitable feed-bait carrier having incorporated therein N-sym-tetrafluorodichloro-2-hydroxy-2-propyl formamide, feeding the bait to the insect and thereafter carrying out an egg viability test to determine the effect of the subject amide as a chemosterilant as well as being an effective insecticide. The steps in such test procedure are as follows:

(A) *Preparation of feed-bait.*—A solid feed-bait carrier comprised of 6 parts of powdered nonfat dry milk, 6 parts granulated sugar and 1 part powdered egg was treated with 1 percent by weight of N-sym-tetrafluorodichloro-2-hydroxy-2-propyl formamide as an acetone solution. After agitation, the acetone was removed by distillation and the resulting treated solid feed was ground to a powder using a mortar and pestle.

(B) *Egg viability test.*—Into an emergence cage containing 48 housefly pupae was placed the solid feed-bait. As a check, a similar emergence cage containing the same number of fly pupae were treated with the identical feed-bait without having incorporated therein N-sym-tetrafluorodichloro-2-hydroxy-2-propyl formamide. Periodic examination of the emergence cages was made to determine the condition of the flies, degree of emergence and toxic effects. After a period of nine days, an oviposition medium is placed in each cage and the following day the medium is examined for eggs. Egg viability is determined by inspecting the medium for growing larvae two to three days after oviposition.

(C) *Oviposition media.*—A typical oviposition medium employed, for example, for the common housefly comprises 1.5 parts of malt syrup, 3.5 parts of yeast, 65 parts water and 30 parts of dry grain consisting of 33½ percent by weight alfalfa meal and 66⅔ percent by weight brewers' grains. The medium was thoroughly admixed and placed in a glass jar and offered to the caged insects to be tested for oviposition for a sufficient period of time, usually a period of 24 hours. At the end of this period, the eggs were counted.

The above procedure and test methods were utilized in determining the effectiveness of N-sym-tetrafluorodichloro-2-hydroxy-2-propyl formamide on the common adult housefly and the following data were obtained.

Of the 48 test flies tested, it was observed that a 62.5% mortality rate was realized after a 7-day period and a mortality rate of 93.7% after 9 days. Of the eygs laid, which were few in number, no larvae developed.

Generally speaking, the N-hexahalohydroxyisopropyl amides of the present invention may be utilized in the effective regulation and destruction of insect population "as is" or by incorporation with a suitable carrier. This carrier may be comprised of an inert substance such as a solvent as illustrated by dialkyl ethers of alkylene glycols, acetone, water and the like, fine or coarse dusts, water-dispersable powders or a suitable bait such as described above. In the preparation of these compositions, effective concentrations have been found to be in the range of from about 1 to 50 parts N-hexahalohydroxyisopropyl amide per 100 parts composition. Such dosage is determined by the intensity of insect life as well as the sought overall results.

The means of application to the locus wherein the insect population is sought to be controlled or destroyed, such as baiting, spraying and dusting breeding and feeding areas, are within the skill of the art.

This invention may be embodied in other forms or carried out in other ways without departing from the spriit or essential characteristics thereof.

We claim:

1. A N-hexahalohydroxyisopropyl amide of the formula:

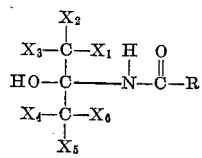

wherein $X_1$, $X_2$, $X_3$, $X_4$, $X_5$ and $X_6$ are halogen independently selected from the group consisting of chlorine and fluorine, with the proviso that at least 2 of these members are fluorine and R is a member selected from the group consisting of hydrogen, alkyl of 1 to 12 carbon atoms, haloalkyl of 1 to 12 carbon atoms, benzyl, aryl of 1 to 12 carbon atoms and lower alkyl-, halo- and nitro-substituted derivatives thereof.

2. N-hexafluoro-2-hydroxy-2-propyl acetamide.
3. N-hexafluoro-2-hydroxy-2-propyl chloroacetamide.
4. N-sym-tetrafluorodichloro-2-hydroxy-2-propyl acetamide.
5. N-sym-tetrafluorodichloro-2-hydroxy-2-propyl formamide.
6. N-hexafluoro-2-hydroxy-2-propyl acetamide.

References Cited

UNITED STATES PATENTS

| 2,603,661 | 7/1952 | Bruce et al. | 260—561 |
| 2,936,323 | 5/1960 | Eden | 260—561 |
| 3,038,010 | 6/1962 | Tawney | 260—561 |
| 3,062,787 | 11/1962 | England | 260—78 |
| 3,102,068 | 8/1963 | Tolbert | 167—22 |
| 3,108,036 | 10/1963 | Molnar | 167—22 |
| 3,123,638 | 3/1964 | Schaeffer | 260—561 |
| 3,133,965 | 5/1964 | Amann et al. | 260—561 |

FOREIGN PATENTS 1,093,615  11/1960  Germany.

OTHER REFERENCES

Larocca et al., Jour. Org. Chem., vol. 16, pages 47–50 (1951).

WALTER A. MODANCE, *Primary Examiner.*

JULIAN S. LEVITT, *Examiner.*

NATALIE TROUSOF, RICHARD H. HUFF,
*Assistant Examiners.*